United States Patent
Ahuja et al.

(10) Patent No.: US 10,662,958 B2
(45) Date of Patent: May 26, 2020

(54) METHOD AND SYSTEMS FOR A RADIATOR FAN

(71) Applicant: Transportation IP Holdings, LLP, Norwalk, CT (US)

(72) Inventors: Munishwar Ahuja, Bangalore (IN); Bret Dwayne Worden, Erie, PA (US); Shankar Chandrasekaran, Bangalore (IN); Vinay Ramu, Bangalore (IN); Adityo Kusumo Ariwibowo, Jakarta (ID)

(73) Assignee: Transportation IP Holdings, LLC, Norwalk, CT (US)

( * ) Notice: Subject to any disclaimer, the term of this patent is extended or adjusted under 35 U.S.C. 154(b) by 19 days.

(21) Appl. No.: 15/073,844

(22) Filed: Mar. 18, 2016

(65) Prior Publication Data
US 2017/0268439 A1 Sep. 21, 2017

(51) Int. Cl.
*F04D 27/00* (2006.01)
*F01P 11/14* (2006.01)
*F02D 41/22* (2006.01)
*G01M 15/04* (2006.01)
*F04D 29/056* (2006.01)

(52) U.S. Cl.
CPC ............ *F04D 27/001* (2013.01); *F01P 11/14* (2013.01); *F02D 41/22* (2013.01); *G01M 15/042* (2013.01); *F02D 2041/227* (2013.01); *F02D 2250/26* (2013.01); *F04D 29/056* (2013.01); *F05D 2260/80* (2013.01); *F05D 2270/334* (2013.01); *Y02T 10/40* (2013.01)

(58) Field of Classification Search
CPC ............ F02D 31/009; F02D 2200/021; F04D 27/001; F01P 11/14; F01P 5/14; F01P 2031/34; G01M 15/042
See application file for complete search history.

(56) References Cited

U.S. PATENT DOCUMENTS

| | | | | |
|---|---|---|---|---|
| 4,977,743 A * | 12/1990 | Aihara | ................ | F01P 7/026 123/41.31 |
| 5,612,672 A * | 3/1997 | Ino | ................ | F01P 7/048 123/41.12 |
| 6,377,876 B1 * | 4/2002 | Hedeen | ................ | F01P 5/14 246/1 R |
| 6,446,026 B1 | 9/2002 | Dean et al. | | |
| 6,468,163 B1 * | 10/2002 | Boffelli | ................ | F01P 7/048 192/84.96 |
| 8,002,251 B2 * | 8/2011 | Hindle | ................ | B64G 1/286 267/140.11 |

(Continued)

FOREIGN PATENT DOCUMENTS

CN 103528822 A 1/2014

*Primary Examiner* — David Hamaoui
(74) *Attorney, Agent, or Firm* — McCoy Russell LLP (57) ABSTRACT

Systems and a method are provided for determining a change in performance of a radiator fan. In one example, a system includes a controller configured to receive a signal output from an accelerometer positioned proximately to and/or operatively coupled with a bearing of a radiator fan, process the signal to determine a peak to peak acceleration value, and indicate a change in performance of the radiator fan when the peak to peak acceleration value is greater than a designated threshold value.

20 Claims, 5 Drawing Sheets

(56) References Cited

U.S. PATENT DOCUMENTS

| | | | |
|---|---|---|---|
| 8,326,582 B2* | 12/2012 | Mian | G01N 29/041 340/540 |
| 8,626,371 B2 | 1/2014 | Kumar et al. | |
| 2010/0030448 A1* | 2/2010 | Roth | F02D 41/008 701/103 |
| 2010/0322385 A1* | 12/2010 | Smith | H01J 35/10 378/131 |
| 2012/0197546 A1* | 8/2012 | LaFrance | G01H 1/00 702/33 |
| 2013/0261832 A1* | 10/2013 | Bastien | B60K 11/04 700/296 |
| 2014/0116124 A1* | 5/2014 | Ma | G05B 23/0232 73/112.01 |
| 2015/0292982 A1* | 10/2015 | Chernega | G01M 13/00 702/56 |

* cited by examiner

METHOD AND SYSTEMS FOR A RADIATOR FAN

BACKGROUND

Technical Field

Embodiments of the subject matter disclosed herein relate to a radiator fan of an engine cooling system.

Discussion of Art

Engines may be cooled via a cooling fluid that dissipates engine heat via a radiator. During certain conditions, such as when a vehicle in which an engine is installed is moving at a relatively low speed, the dissipation of the heat in the cooling fluid at the radiator may be facilitated by a radiator fan. The radiator fan may include various moving parts that, if they become worn or degraded, may impact radiator fan performance, thus reducing the cooling capability of the cooling fluid and eventually leading to engine overheating.

BRIEF DESCRIPTION

In one embodiment, a system includes a controller configured to receive a signal output from an accelerometer positioned proximately to and/or operatively coupled with a bearing of a radiator fan, process the signal to determine a peak to peak acceleration value, and indicate a change in performance of the radiator fan when the peak to peak acceleration value is greater than a designated threshold value.

DETAILED DESCRIPTION

The following description relates to embodiments of a radiator fan, which may be part of an engine cooling system. For example, the radiator fan may cool engine cooling fluid at a radiator. In order to identify potential issues that may impact radiator fan performance, vibrations associated with one or more bearings along the shaft of the radiator fan may be monitored via an accelerometer, which is configured to measure acceleration in one or more axes and/or at one or more locations. In particular, acceleration of one or more bearings of the radiator fan may be measured and a peak to peak acceleration value and kurtosis value may be obtained from the accelerometer data. The peak to peak acceleration value and kurtosis value may be monitored over time, and may indicate a change in performance of the radiator fan. For example, when the peak to peak acceleration value exceeds a threshold value, it may indicate a bearing is worn, degraded, or otherwise in need of service. By monitoring bearing acceleration over time, a change in radiator fan performance may be observed before the radiator fan exhibits degradation, and the radiator fan operation may be adjusted to prolong the life of the radiator fan, for example. As explained above, the radiator fan may be included in a vehicle system that includes an engine. However, fan performance as described herein may be applied to other fans, such as blower fans, or to other engine and/or vehicle components that include rotating parts.

Figure 1:
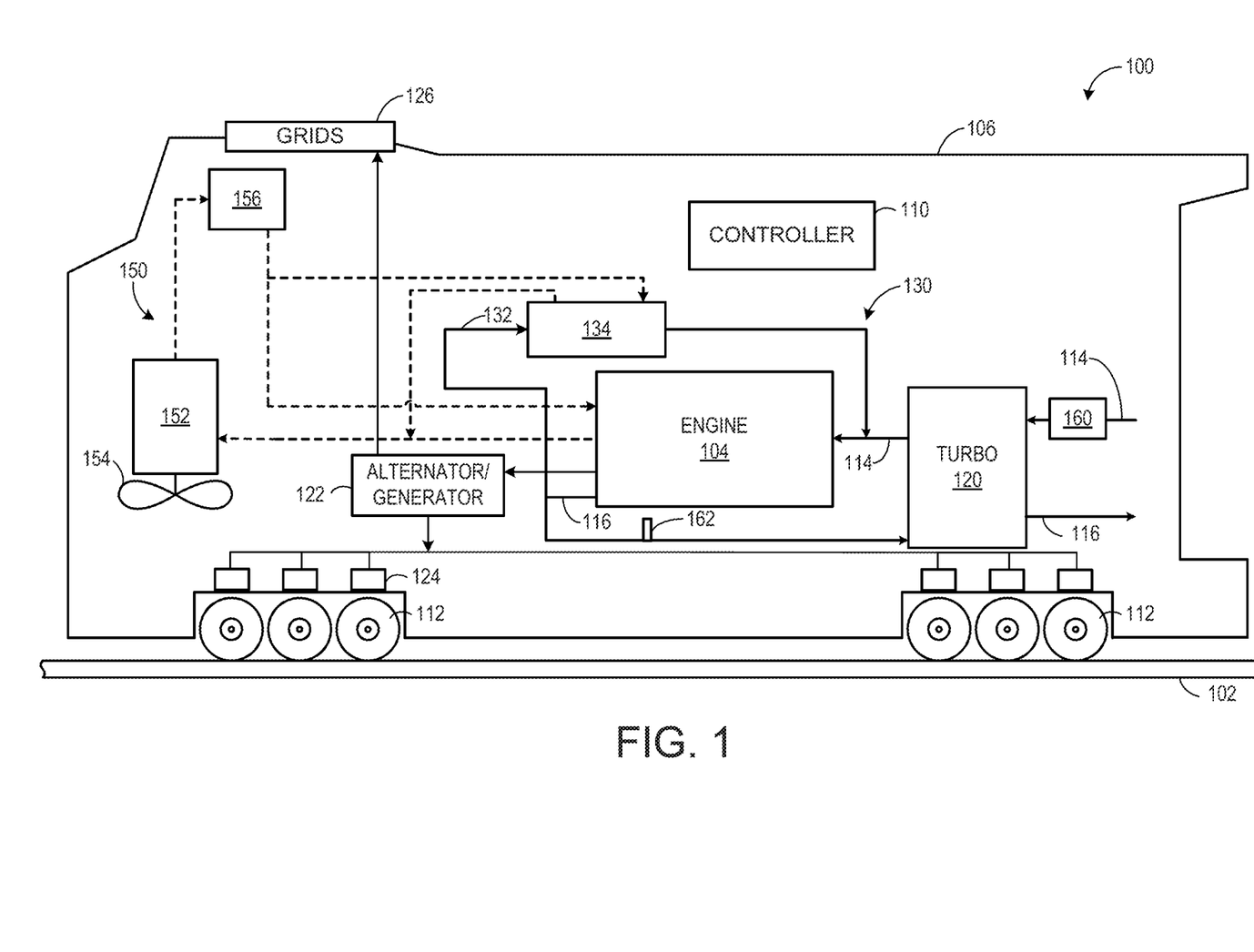
FIG. 1 shows a schematic diagram of a rail vehicle with an engine according to an embodiment of the invention.
Figure 3:
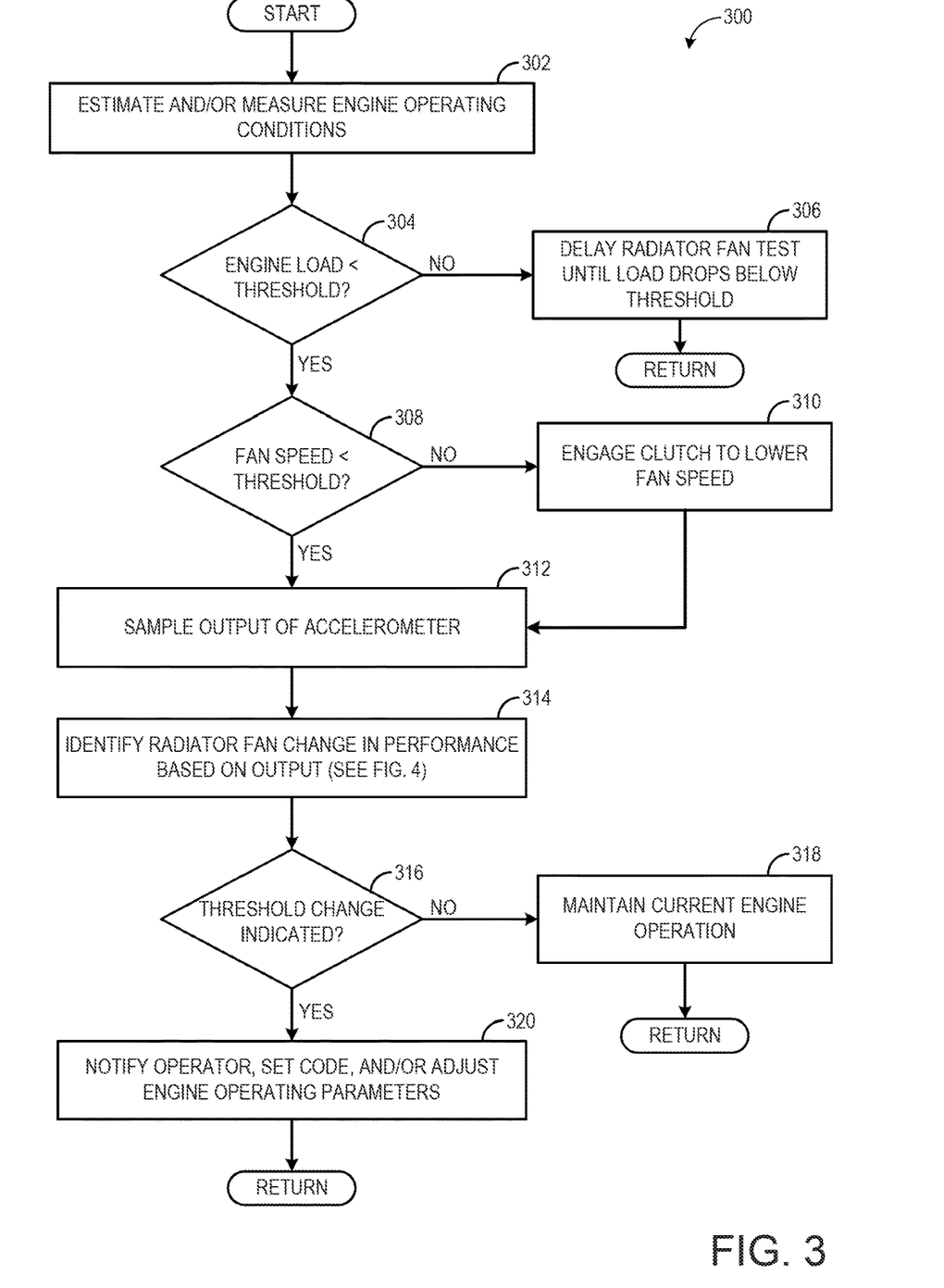
FIG. 3 is a flow chart illustrating a method for performing a radiator fan test.
Figure 4:
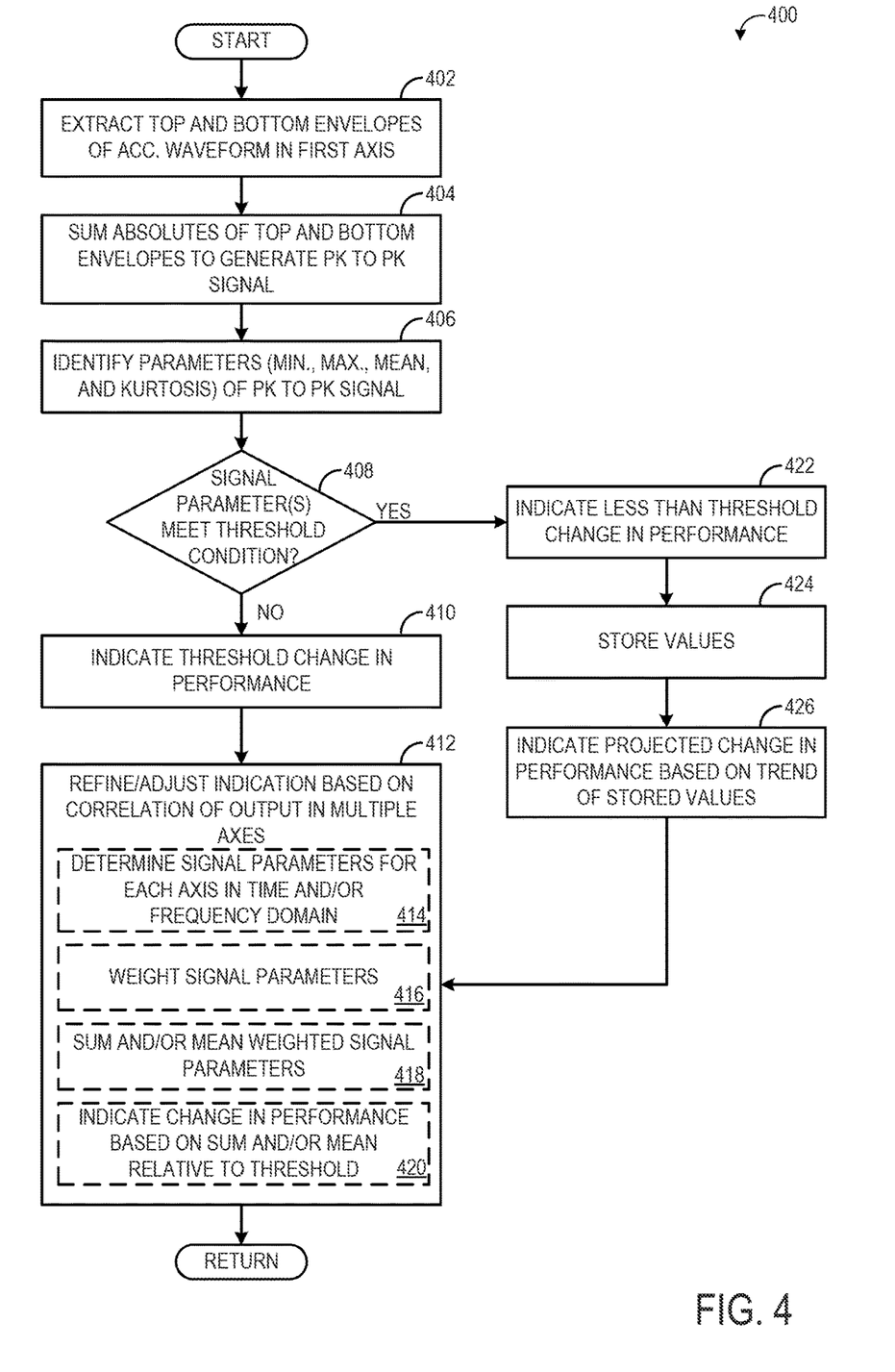
FIG. 4 is a flow chart illustrating a method for determining a level of change in performance of a radiator fan.
Figure 5:
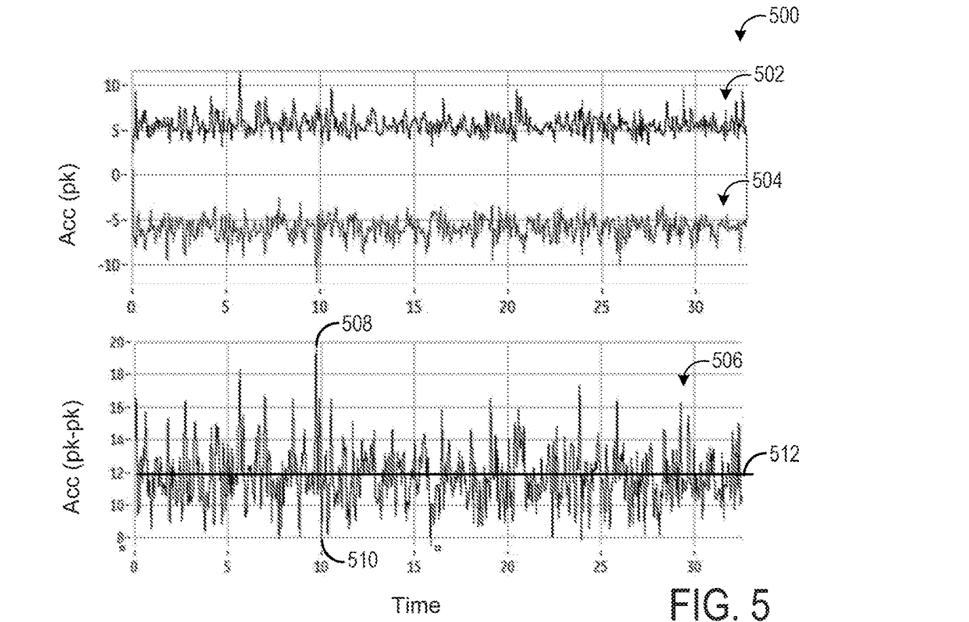
FIG. 5 is diagram illustrating an example accelerometer waveform.
Figure 6:
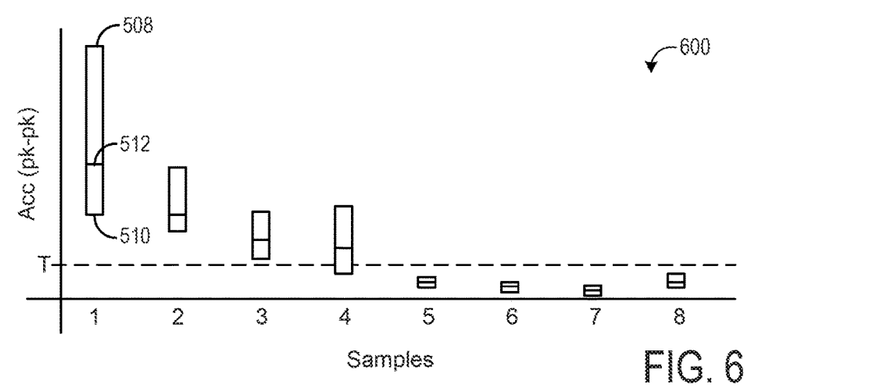
FIG. 6 is a diagram illustrating example peak to peak acceleration values obtained from accelerometer data for a plurality of radiator fans.
Figure 7:
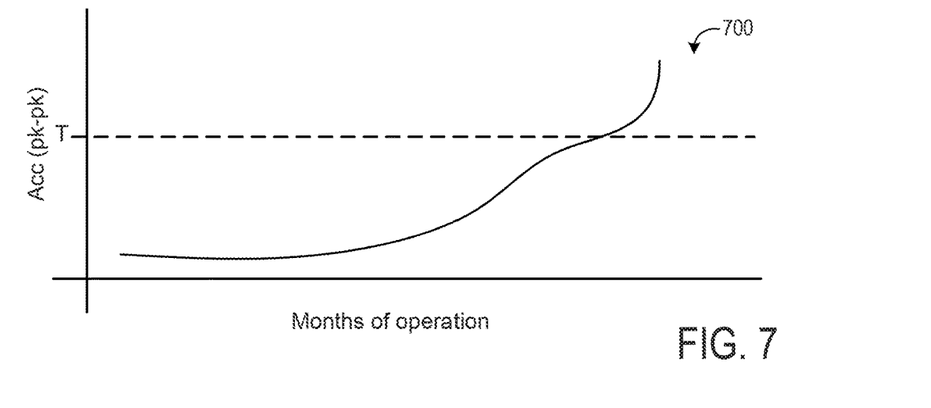
FIG. 7 is a graph illustrating an example change in radiator fan performance over time.

One embodiment of a vehicle in which an engine may be installed is shown in FIG. 1. The vehicle of FIG. 1 includes a radiator cooled by a radiator fan. The radiator fan of FIG. 1 is illustrated schematically in FIG. 2. FIGS. 3 and 4 are flow charts illustrating various routines for monitoring change in performance of a radiator fan, such as the radiator fan of FIGS. 1 and 2. FIG. 5 illustrates properties of an example waveform including peak to peak acceleration values that may be analyzed to determine radiator fan performance. FIG. 6 illustrates example peak to peak acceleration values for a plurality of radiator fans. FIG. 7 illustrates a change in peak to peak acceleration values for a radiator fan over time.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach diagnosing performance of a radiator fan, an example of a platform is disclosed in which an engine, engine cooling system, and associated radiator and radiator fan may be configured for a vehicle, such as a rail vehicle. For example, FIG. 1 shows a block diagram of an embodiment of a vehicle system 100, herein depicted as a rail vehicle 106 (e.g., locomotive), configured to run on a rail 102 via a plurality of wheels 112. As depicted, the rail vehicle includes an engine 104. In other non-limiting embodiments, the engine may be a stationary engine, such as in a power-plant application, or an engine in a marine vessel or other off-highway vehicle propulsion system as noted above.

The engine receives intake air for combustion from an intake passage 114. The intake passage receives ambient air from an air filter 160 that filters air from outside of the rail vehicle. Exhaust gas resulting from combustion in the engine is supplied to an exhaust passage 116. Exhaust gas flows through the exhaust passage, and out of an exhaust stack of the rail vehicle. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally combust fuel including gasoline, kerosene, natural gas, biodiesel, or other petroleum distillates of similar density through compression ignition (and/or spark ignition).

In one embodiment, the rail vehicle is a diesel-electric vehicle. As depicted in FIG. 1, the engine is coupled to an electric power generation system, which includes an alternator/generator 122 and electric traction motors 124. For example, the engine is a diesel and/or natural gas engine that generates a torque output that is transmitted to the alternator/generator which is mechanically coupled to the engine. In one embodiment herein, the engine is a multi-fuel engine operating with diesel fuel and natural gas, but in other examples the engine may use various combinations of fuels other than diesel and natural gas.

The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of the plurality of wheels to provide tractive power to propel the rail vehicle. One example configuration includes one traction motor per wheel set. As depicted herein, six traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by alternator/generator.

In some embodiments, the vehicle system may include a turbocharger 120 that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Additionally or alternatively, in some embodiments, a supercharger may be present to compress the intake air via a compressor driven by a motor or the engine, for example. Further, in some embodiments, a charge air cooler (e.g., water-based intercooler) may be present between the compressor of the turbocharger or supercharger and intake manifold of the engine. The charge air cooler may cool the compressed air to further increase the density of the charge air.

In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or systems.

The vehicle system may further include an exhaust gas recirculation (EGR) system 130 coupled to the engine, which routes exhaust gas from the exhaust passage of the engine to the intake passage downstream of the turbocharger. In some embodiments, the exhaust gas recirculation system may be coupled exclusively to a group of one or more donor cylinders of the engine (also referred to a donor cylinder system). As depicted in FIG. 1, the EGR system includes an EGR passage 132 and an EGR cooler 134 to reduce the temperature of the exhaust gas before it enters the intake passage. By introducing exhaust gas to the engine, the amount of available oxygen for combustion is decreased, thereby reducing the combustion flame temperatures and reducing the formation of nitrogen oxides (e.g., $NO_x$).

In some embodiments, the EGR system may further include an EGR valve for controlling an amount of exhaust gas that is recirculated from the exhaust passage of the engine to the intake passage of the engine. The EGR valve may be an on/off valve controlled by a controller 110, or it may control a variable amount of EGR, for example. As shown in the non-limiting example embodiment of FIG. 1, the EGR system is a high-pressure EGR system. In other embodiments, the vehicle system may additionally or alternatively include a low-pressure EGR system, routing EGR from downstream of the turbine to upstream of the compressor.

As depicted in FIG. 1, the vehicle system further includes a cooling system 150 (e.g., engine cooling system). The cooling system circulates coolant through the engine to absorb waste engine heat and distribute the heated coolant to a heat exchanger, such as a radiator 152 (e.g., radiator heat exchanger). In one example, the coolant may be water. A fan 154 may be coupled to the radiator in order to maintain an airflow through the radiator when the vehicle is moving slowly or stopped while the engine is running. In some examples, fan speed may be controlled by the controller. Coolant which is cooled by the radiator may enter a tank (not shown). The coolant may then be pumped by a water, or coolant, pump 156 back to the engine or to another component of the vehicle system, such as the EGR cooler and/or charge air cooler.

The rail vehicle further includes the controller (e.g., engine controller) to control various components related to the rail vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation. In some examples, the controller may include more than one controller each in communication with one another, such as a first controller to control the engine and a second controller to control other operating parameters of the locomotive (such as tractive motor load, blower speed, etc.). The first controller may be configured to control various actuators based on output received from the second controller and/or the second controller may be configured to control various actuators based on output received from the first controller.

The controller may receive information from a plurality of sensors and may send control signals to a plurality of actuators. The controller, while overseeing control and management of the engine and/or rail vehicle, may be configured to receive signals from a variety of engine sensors, as further elaborated herein, in order to determine operating parameters and operating conditions, and correspondingly adjust various engine actuators to control operation of the engine and/or rail vehicle. For example, the engine controller may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, gas temperature in the EGR cooler, or the like. The controller may also receive a signal of an amount of water in the exhaust from an exhaust oxygen sensor 162. Additional sensors, such as an accelerometer, may be positioned in the cooling system and will be described further below with reference to FIG. 2. Correspondingly, the controller may control the engine and/or the rail vehicle by sending commands to various components such as the traction motors, the alternator/generator, fuel injectors, valves, or the like. For example, the controller may control the operation of the radiator fan, the cooling system cooling fluid flow rate, engine output, etc., as described further below. Other actuators may be coupled to various locations in the rail vehicle.

Figure 2:
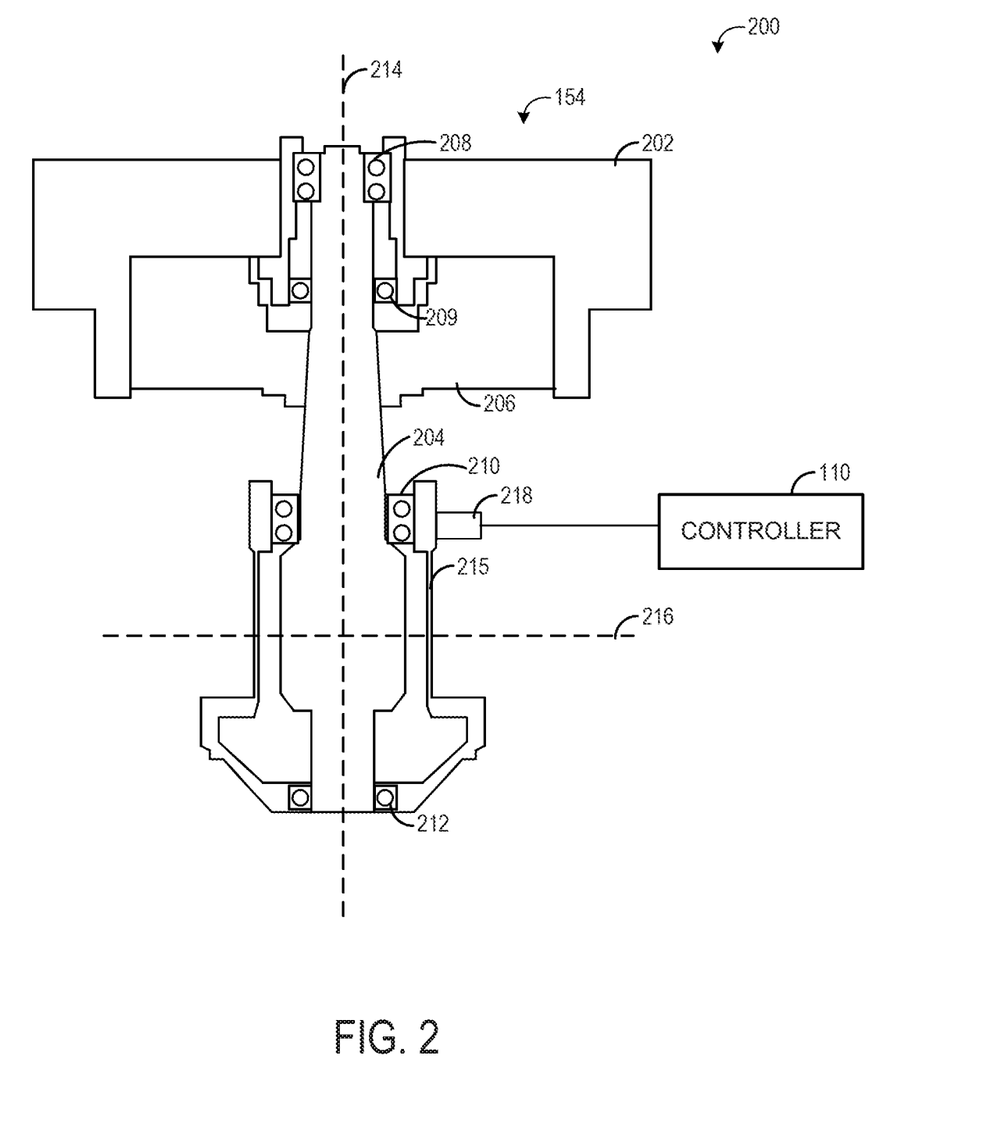
FIG. 2 schematically shows an example radiator fan system.

FIG. 2 schematically shows an example fan system 200 that includes fan 154 of FIG. 1. As such, fan system 200 may be installed in a vehicle, such as vehicle system 100 of FIG. 1, in order to cool a radiator of the vehicle, for example. Fan 154 includes a wheel 202 that includes a plurality of blades (not shown in FIG. 2), configured to rotate via coupling to shaft 204. Shaft 204 may rotate via a mechanical linkage to an engine (e.g., via a belt or drive shaft coupled to engine 104) or via an electric motor. In some examples, the rotational speed of wheel 202 may be adjusted via a clutch 206. For example, clutch 206 may be an electromagnetic clutch that when engaged causes wheel slip, lowering the speed of wheel 202.

Fan 154 has a rotational axis 214 that is parallel to a longitudinal axis of the shaft 204 and a transverse axis 216 that is perpendicular to rotational axis 214. When installed in a vehicle, such as vehicle system 100, transverse axis 216 may be parallel the ground on which the vehicle sits and rotational axis 214 may be perpendicular to the ground. Further, in some examples, transverse axis 216 may be parallel to a longitudinal axis of the engine of the vehicle (e.g., engine 104).

Fan 154 includes a plurality of bearings, including bearings 208 and bearings 209 located at the top of shaft 204 and at the shaft/wheel interface, bearings 210 located in the middle of shaft 204, and bearings 212 located at the base of shaft 204. The bearings prevent friction between shaft 204 and a casing/housing 215 housing the shaft (e.g., bearings 210 and 212) and assist with translation of rotational movement of shaft 204 to wheel 202 (e.g., bearings 208). The bearings may include ball bearings housed between an inner race and an outer race, for example, and may be lubricated via a suitable lubricant.

Over time, one or more of the bearings may begin to wear, in particular if the lubricant in the bearing leaks or otherwise degrades. However, such wear on the one or more bearings may be difficult to detect with standard service protocols, given that the bearings are not visible (e.g., they are housed within the radiator fan housing). If such wear is allowed to progress, the radiator fan may eventually become degraded or non-operational, leading to potential engine overheating events or requiring complete replacement of the radiator fan, which may be costly.

Thus, radiator fan performance may be monitored via bearing acceleration data collected by one or more uni/multiaxial accelerometers. As shown in FIG. 2, an accelerometer 218 may be coupled to the radiator fan at a desired location, such as in proximity to one or more bearings. Accelerometer 218 is shown coupled to casing/housing 215 at bearings 210. Accelerometer is operatively coupled (via a wired or wireless connection, for example) to an on-board control unit, such as controller 110 of FIG. 1 and/or to an off-board control unit. The acceleration data collected by accelerometer 218 may be used by the control unit to determine if a change in radiator fan performance has occurred, and if so an operator may be notified and/or various engine and/or radiator fan operating parameters may be adjusted, as explained in more detail below. Accelerometer 218 is configured to transmit a signal indicative of acceleration and/or velocity of casing/housing 215 (which is caused by movement of the internal bearings). More specifically, accelerometer 218 monitors changes in acceleration, i.e. the rate of change of velocity with respect to time, and communicates these changes to the control unit. Accelerometer 218 may suitably configured to measure acceleration in at least one axis, and may be configured to measure acceleration in at least three axes (e.g., x, y, and z), and may include at least one of a piezo-film accelerometer, surface micro-machined capacitive (MEMS) accelerometer, a bulk micro-machined capacitive accelerometer, a piezo-electric accelerometer, a magnetic induction accelerometer, and/or an optical accelerometer, for example.

FIG. 3 is a flow chart illustrating a method 300 for performing a radiator fan performance test. Method 300 may be carried out according to instructions stored in memory of a control unit, such as controller 110 of FIG. 1, in combination with one or more sensors, such as accelerometer 218 of FIG. 2, one or more actuators, such as a radiator fan clutch, fuel injector, etc., and/or one or more additional electronic devices, such as a display device operatively coupled to the control unit.

At 302, method 300 includes estimating and/or measuring engine operating conditions, which may include but is not limited to engine speed, engine load, radiator fan speed, a time since a previous radiator fan performance test, and/or other conditions. At 304, method 300 determines if engine load is below a threshold load. In one example, engine load may be determined based on a throttle setting (such as a notched throttle), and the threshold load may be a relatively low throttle setting, such as 15% of a maximum throttle setting. Other mechanisms for determining engine load are possible, such as based on fuel flow, engine air flow, or other parameters. If engine load is not less than the threshold, for example if the engine is being operated at a notch throttle setting of notch 2 or higher, method 300 proceeds to 306 to delay the radiator fan test until the engine load drops below the threshold, and then method 300 returns.

If engine load is below the threshold, for example if the engine is operating at notch throttle setting of notch 1 or lower (e.g., idle), method 300 proceeds to 308 to determine if radiator fan speed is less than a threshold speed. The threshold fan speed may be a suitable fan speed, such as the maximum rated fan speed. If the fan speed is not lower than the threshold (e.g., if the fan is being operated at maximum rated speed), method 300 proceeds to 310 to engage a clutch of the radiator fan to lower fan speed. In one example, clutch engagement may result in the radiator fan operating at a speed of half the maximum rated speed.

If the fan speed is less than the threshold speed, or once the clutch is engaged to lower fan speed, method 300 proceeds to 312 to perform the radiator fan performance test by sampling the output of the accelerometer and identify a level of radiator fan change in performance based on the output from the accelerometer at 314, which will be described in more detail below with respect to FIG. 4. Briefly, accelerometer data in at least one axis is analyzed to determine a kurtosis value and a peak to peak acceleration value, which represents the largest extremes in the acceleration data. The peak to peak acceleration value is compared to a threshold value and/or a trend in the peak to peak acceleration values collected over time is evaluated to determine if a change in performance of the radiator fan is present.

At 316, method 300 determines if a threshold change in performance is indicated. The threshold change in performance may be indicated when the peak to peak acceleration value and/or kurtosis value exceeds a respective threshold value and/or when a slope of peak to peak acceleration values plotted over time is greater than a threshold, as will be explained below with respect to FIG. 4. If a threshold change in performance is not indicated, method 300 proceeds to 318 to maintain current engine and radiator fan operation, which may include maintaining current engine speed and power, current coolant flow rate, current radiator fan activation and/or speed (which may include releasing the radiator fan clutch engagement to resume radiator fan speed prior to carrying out the radiator fan test), or other parameters. Method 300 then returns.

If the threshold change in performance is indicated, method 300 proceeds to 320 to notify an operator, set a diagnostic code, and/or adjust engine operating parameters. To notify the operator, an indication of the performance of the radiator fan may be output on a display device, which may include outputting the accelerometer signal waveforms and/or other representations of the actual accelerometer data. When the radiator fan is determined to exhibit a change in performance, one or more operating parameters may be adjusted to delay any further wear on the radiator fan. The one or more operating parameters may include engine power, for example engine power may be derated responsive to the indication of the change in performance of the radiator fan to reduce the cooling needs of the engine. As a result, the radiator fan may be operated with a reduced speed and/or may be deactivated to prevent additional wear on the radiator fan. Derating engine power may include reducing fuel injection amounts to the engine, decreasing engine load, and/or other suitable adjustments. In another example, cooling fluid flow rate may be adjusted responsive to the indication of the change in performance of the radiator fan to reduce the radiator fan cooling demand, allowing the fan to be operated at lower speed or be deactivated. In a still further example, if the engine cooling system includes an additional cooling fan, the additional cooling fan may be activated and/or operated at an increased speed responsive to the indication of the change in performance of the radiator fan, allowing the radiator fan to be operated at lower speed or to be deactivated. In some examples, the operating parameter selected for adjustment may be based on the level of the performance change, e.g., if a larger or more severe change in performance is detected, the engine may be derated or even deactivated, while if a smaller or less severe change in performance is detected, cooling fluid flow rate may be adjusted. Method 300 then returns.

Turning now to FIG. 4, a method 400 for determining a level of radiator fan change in performance is presented. Method 400 may be executed as part of method 300 presented above with respect to FIG. 3, for example method 400 may be executed responsive to engine load below a threshold load and radiator fan speed below a threshold speed. By determining radiator fan change in performance only when the engine is operating at idle or light load and only when fan speed is less than a threshold speed (such as less than maximum rated speed), the accelerometer data used to determine the performance of the radiator fan may more accurately reflect the acceleration of the bearing the accelerometer is positioned proximate to, and may not reflect other sources of vibration, such as vibration from the engine, vibration from rotation of the fan wheel at high speed, etc.

At 402, method 400 includes extracting the top and bottom envelopes of the accelerometer waveform, where the accelerometer waveform is of the voltage signal output from the accelerometer in a first axis. In one example, the accelerometer voltage signal in the first axis may represent acceleration in the z-axis (e.g., rotational acceleration). At 404, method 400 sums the absolute values of each of the top envelope and bottom envelope to generate a peak to peak acceleration signal. At 406, method 400 identifies various parameters of the peak to peak acceleration signal, including the minimum peak to peak acceleration value, the maximum peak to peak acceleration value, the mean peak to peak acceleration value, and a kurtosis value from the peak to peak acceleration signal. The kurtosis value may reflect how much of the variation observed in the accelerometer signal is due to infrequent variation relatively distant from the mean vs. frequent variation close to the mean, relative to a normal distribution, for example. In one example, a high kurtosis value may reflect infrequent variation (of higher magnitude) from the mean relative to a normal distribution, while a low kurtosis value may reflect frequent variation (of lower magnitude) from the mean relative to a normal distribution.

FIG. 5 is a diagram 500 illustrating an example top and bottom envelope of an accelerometer waveform and a sum of the absolute values of the top and bottom envelope to generate the peak to peak acceleration signal. For both plots of diagram 500, time is depicted along the horizontal (x) axis and acceleration (for example, in gs) is depicted along the vertical (y) axis. Curve 502 is the top envelope of the waveform and curve 504 is the bottom envelope of the waveform. When the absolute values of curve 502 and absolute values of curve 504 are summed, the resultant signal is the peak to peak acceleration signal, shown by curve 506. The peak to peak acceleration signal includes a maximum value 508 and a minimum value 510 as well as mean value 512.

Returning to FIG. 4, method 400 determines, at 408, if one or more signal parameters determined at 406 meets a threshold condition. In one example, this may include one or more of the minimum peak to peak acceleration value, maximum peak to peak acceleration value, and mean acceleration peak to peak acceleration value being greater than a threshold value. The threshold value may be a suitable value, such as 2g acceleration, that indicates a relatively significant change in performance of the radiator fan, for example such that if the bearing were to be examined, visible wear may be present on the ball bearing and/or inner or outer race. In another example, the threshold value may reflect an amount of wear or degradation of the bearing that, if allowed to continue, may result in damage to the radiator fan that renders the radiator fan non-operational. The threshold value may be determined empirically based on testing a plurality of radiator fans, for example. In some examples, the kurtosis value may also be utilized in order to determine if the variation is infrequent or frequent, and the determination of the performance of the radiator fan may be at least partially based on the kurtosis, as will be explained below. FIG. 6 is a diagram 600 illustrating maximum, minimum, and mean peak to peak acceleration values for a plurality of radiator fans. Acceleration is depicted along the vertical (y) axis and each radiator fan sample is plotted along the horizontal (x) axis. As shown, sample 1 includes the maximum value 508, minimum value 510, and mean value 512 from the peak to peak acceleration signal illustrated in FIG. 5. Also shown in FIG. 5 is a threshold value, illustrated by the dotted line. For the first sample, all of the maximum value, minimum value, and mean value are above the threshold. Likewise, samples 2 and 3 include maximum values, minimum values, and mean values above the threshold. Sample 4 includes the maximum value and mean value above the threshold, but the minimum value below the threshold. Samples 5-7 all include the maximum value, minimum value, and mean value being below the threshold.

Accordingly, samples 1-3 may be indicated to have a greater than threshold change in performance of a respective radiator fan, while samples 5-7 may be indicated to have a less than threshold change in performance of a respective fan. Sample 4 may be indicated to have a greater than threshold change in performance of its radiator fan, due to at least one of the maximum, minimum, and mean values being above the threshold. In other examples, however, the threshold level change in performance may only be indicated when all of the maximum value, minimum value, and mean value are greater than the threshold, and thus sample 4 may be indicated to have a less than threshold change in performance due to its minimum value being below the threshold.

Additionally, samples 1-4 may display a higher kurtosis value than samples 5-7. This is reflected by the larger distance from the mean of the respective minimum and maximum values of samples 1-4 relative to samples 5-7. In other words, samples 1-4 display a larger spread of peak to peak acceleration values than samples 5-7.

Returning to FIG. 4, if it is determined that one or more of the signal parameters do not meet a threshold condition, for example if at least one of the maximum value, minimum value, and mean value is greater than the threshold, method 400 proceeds to 410 to indicate a threshold level change in radiator fan performance. Responsive to the indication, an operator may be notified, a diagnostic code may be set, and/or one or more operational parameters may be adjusted, as explained above with respect to FIG. 3. Further, in some examples the kurtosis value may be analyzed to determine if a threshold change in radiator fan performance is present. In one example, if the kurtosis value is high, a high kurtosis value may indicate aberrations in the accelerometer data that are indicative of bearing wear, for example, and thus a high kurtosis value may indicate the change in performance is above the threshold. However, in other examples high kurtosis values may be indicative of an infrequent, non-regular source of acceleration, such as poor rail or road conditions, and thus even if the mean peak to peak value is above a threshold, it may be determined that the change in performance is below the threshold level if the kurtosis level is high.

In some embodiments, the change in performance determined as described above may be refined and/or adjusted based on correlation of accelerometer output in multiple axes and/or at multiple radiator fan locations, as indicated at 412. This may include determining one or more designated accelerometer signal parameters in one or more axes and/or at one or more locations in the time and/or frequency domain, as indicated at 414. For example, the peak to peak acceleration values described above may be determined in all three accelerometer axes. In another example, the accelerometer output in each axis may be transformed into the frequency domain and the peak magnitude for one or more selected frequency components may be identified (e.g., first order frequency component, second order frequency component, etc.).

Correlating the accelerometer output in multiple axes may further include weighting each of the signal parameters determined above, as indicated at 416. For example, the mean peak to peak acceleration value for the accelerometer output in a first axis (e.g., the x axis) may be given a first, lower weight, the mean peak to peak acceleration value for the accelerometer output in a second axis (e.g., the y axis) may be given a second, middle weight, and the mean peak to peak acceleration value for the accelerometer output in a third axis (e.g., the z axis) may be given a third, higher weight. In this way, the peak to peak acceleration value for the axis most likely to exhibit vibrations due to change in bearing performance (in the radiator fan system of FIG. 2, this axis may be the z axis which corresponds to the rotational acceleration) may be given more weight than the peak to peak acceleration value for the axis most likely to exhibit vibrations due to the engine (which in the radiator fan system of FIG. 2 may be the x axis due to the vertically-mounted radiator fan having a longitudinal/rotational axis perpendicular to the longitudinal axis of the engine). By doing so, sources of noise may be minimized while still evaluating all vibrational movement of the bearings, for example. In other examples, certain frequency components may be given higher weight than other frequency components.

As indicated at 418, the weighted signal parameters may be summed and/or averaged, and as indicated at 420, the weighted sum or weighted average of the signal parameters may be compared to a threshold, and if the weighted sum or the weighted average is greater than the threshold, change in performance of the radiator fan may be indicated. Method 400 then returns.

Returning to 408, if it is determined that all the signal parameters meet respective threshold conditions (e.g., none of the maximum value, minimum value, or mean value is above the threshold value, or, in some examples, if the mean value does not exceed the threshold value), method 400 proceeds to 422 to indicate a less than threshold change in radiator fan performance. However, in some examples, the peak to peak acceleration values may be stored in memory of the control unit, as indicated at 424. Over time, the peak to peak acceleration values may be plotted to determine a rate of change of the peak to peak acceleration values, for example, which may indicate a potential change in radiator fan performance. If the rate is relatively high, for example, the radiator fan may be serviced even if the change in performance is still lower than the threshold value. Thus, as indicated at 426, a projected change in performance of the radiator fan may be determined based on the trend (e.g., slope) of the stored values. In some examples, if the projected change in performance is determined to occur in a relatively short amount of time and/or if the rate of change of performance is relatively high, operational parameters may be adjusted (e.g., reduced radiator fan speed, compensatory cooling mechanisms such as increased cooling fluid flow rate) to prolong the life of the radiator fan. Method 400 then returns.

An example plot of peak to peak values over time is depicted by graph 700 of FIG. 7, which shows the change in performance of the radiator fan (as represented by the mean peak to peak acceleration value) approaching and then exceeding the threshold value. In some examples, a series of peak to peak acceleration values may collected over time, and the series of values may be analyzed to determine if one of the peak to peak acceleration values of the series differs from another of the peak to peak acceleration values of the series by an amount greater than a determined historical peak acceleration value threshold. In other words, a gradual increase in peak to peak acceleration values is expected over the life of the radiator fan, but if a sudden jump in peak to peak acceleration values is observed, it may be indicative of a change in performance of the radiator fan.

Thus, the performance of a radiator fan may be monitored by analyzing acceleration data output from an accelerometer coupled to the radiator fan. In one example, the accelerometer may be coupled at a location on the radiator fan that is proximate one or more bearings of the radiator fan, in order to measure vibration of the radiator fan resulting from bearing movement. If the one or more bearings are worn or degraded, the one or more bearings may begin to exhibit increased acceleration and/or other movement that may be measured by the accelerometer. However, the accelerometer may be used to measure vibrations of the radiator fan resulting from fan imbalance or other radiator fan condition. Further, while the bearing condition analysis described above may be applied on both motor-driven and engine-driven radiator fans, motor-driven radiator fans may experience additional performance changes not found in engine-driven radiator fans, including change in motor bearing condition, which may be analyzed via the accelerometer data as described above.

Further, additional factors other than radiator fan vibration may be included in the determination of the radiator fan performance change. Example parameters that could be analyzed include motor age, duty use of the motor, current drawn by the motor, belt and/or drive shaft speed, or other factors. For example, the peak to peak acceleration value may indicate that the radiator fan is not at the threshold level of performance change, yet the motor duty use may be relatively high (e.g., higher than expected for the age of the motor), and thus it may be determined that the radiator fan is above the threshold level of performance change in order to signal to an operator to perform maintenance on the radiator fan to prevent additional or unexpected performance issues.

As explained above with respect to FIG. 4, cross-correlation or auto-correlation of accelerometer data in multiple axes or accelerometer data from multiple radiator fan locations may be used to identify if a change in radiator fan performance is occurring, such as by weighting selected frequency components of the accelerometer signal from each axis and summing or averaging the weighted frequency components. However, other mechanisms for correlating the data from the multiple accelerometer axes may be used. In one example, the mean peak to peak acceleration value for each axis may be entered into a look-up table, where the table indexes the mean peak to peak acceleration value for each axis to a level of performance change. A similar approach could be taken for selected frequency components. For example, the magnitude of one or more selected frequency components from each axis may be entered into a look-up table to determine the level of performance change.

When the radiator fan is determined to have a threshold level of performance change, various operating parameters may be adjusted to prolong the life of the radiator fan until the radiator fan is able to be serviced, as explained above. In some examples, rather than just determining that the level of performance change is above a threshold and adjusting operating parameters accordingly, the control unit may determine a projected timeframe that the radiator fan may remain operational under the current conditions. If the projected timeframe is less than the time predicted for a current vehicle trip/mission to reach completion, various operating parameters may be adjusted to reduce the radiator fan demand and allow the radiator fan to remain operational during the entirety of the current trip or mission. Additionally, rather than compare the peak to peak acceleration value to a fixed threshold, the control unit may determine if the peak to peak acceleration value is different (e.g., greater) than expected, based on a rate of change of the peak to peak acceleration values collected during previous radiator fan tests. If the peak to peak acceleration value is greater than expected, it may be determined that the radiator fan change in performance is above the threshold level.

In this way, the performance of the radiator fan may be monitored over time in order to predict and/or observe a change in performance that may be indicative of current or future fan degradation. By identifying potential radiator fan conditions prior to fan degradation actually occurring, preventative actions and/or maintenance may be performed to prevent engine overheating events or costly radiator fan repairs or replacement. The radiator fan performance condition may be monitored by an on-board control unit, as described above. In other examples, the radiator fan performance condition may be determined by an off-board control unit, such as a hand held computing device or a computing device located in a remote dispatch unit or wayside. In such examples, the accelerometer voltage signal may be communicated to the off-board device.

Thus, an embodiment for a system includes a controller. The controller is configured to receive a signal output from an accelerometer at least one of positioned proximately to or operatively coupled with a bearing of a radiator fan, process the signal to determine one or more of a peak to peak acceleration value, a correlation value, or a kurtosis value, and indicate a change in performance of the radiator fan when one or more of the peak to peak acceleration value, the correlation value, or the kurtosis value is greater than a respective designated threshold value. The controller may be configured to extract a top envelope of the signal output from the accelerometer, extract a bottom envelope of the signal output from the accelerometer, and sum the top envelope and bottom envelope to generate a peak to peak acceleration signal, wherein the peak to peak acceleration value comprises a mean of the peak to peak acceleration signal, and wherein the kurtosis value is a kurtosis value of the peak to peak acceleration signal. In an example, the accelerometer is coupled to a casing of a radiator fan housing and is operatively coupled to the controller via a wired or wireless connection, and the accelerometer comprises a piezo-film accelerometer, surface micro-machined capacitive accelerometer, a bulk micro-machined capacitive accelerometer, a piezo-electric accelerometer, a magnetic induction accelerometer, and/or an optical accelerometer. In an example, the controller is configured to indicate a change in performance of the radiator fan when both the peak to peak acceleration value and kurtosis value are greater than the respective designated threshold values and when a radiator fan speed of the radiator fan is lower than a threshold speed value. In an example, the controller is configured to indicate a change in performance of the radiator fan when both the peak to peak acceleration value and kurtosis value are greater than the respective designated threshold values and when an engine configured to receive cooling fluid from a radiator cooled by the radiator fan is operating at a load below a threshold load. In an example, the controller is configured to increase a flow rate of the cooling fluid and/or operate the radiator fan at a reduced speed responsive to the indication of the change in performance of the radiator fan. In an example, the controller is further configured to: store a series of peak to peak acceleration values over time; determine if one of the peak to peak acceleration values of the series differs from another of the peak to peak acceleration values of the series by an amount greater than a determined historical peak acceleration value threshold; and indicate a change in performance of the radiator fan when one of the peak to peak acceleration values of the series differs from another of the peak to peak acceleration values of the series by the amount greater than the determined historical peak acceleration value threshold.

An embodiment relates to a system, including a radiator fan configured to cool cooling fluid from an engine at a radiator; an accelerometer at least one of positioned proximate to or operatively coupled with a bearing of the radiator fan; and a controller. The controller is configured to: responsive to an engine load being below a threshold load value and the radiator fan operating within a designated speed range, determine a peak to peak acceleration value of a signal output from the accelerometer; and indicate a change in performance of the radiator fan based on the peak to peak acceleration value. In an example, the peak to peak acceleration value comprises one or more of a mean of a peak to peak acceleration signal extracted from the signal output from the accelerometer, a correlation value of the peak to peak acceleration signal, or a kurtosis value of the peak to peak acceleration signal. In an example, the controller is configured to extract a top envelope of the signal output from the accelerometer, extract a bottom envelope of the signal output from the accelerometer, and sum absolutes of the top envelope and bottom envelope to extract the peak to peak acceleration signal. In examples, the system is mounted in a vehicle, the engine has a longitudinal axis parallel to a plane of a ground on which the vehicle is configured to rest, and the radiator fan has a rotational axis perpendicular to the longitudinal axis of the engine. In examples, the peak to peak acceleration value is a first peak to peak acceleration value of a signal in a first axis of the accelerometer, and the controller is configured to determine a second peak to peak acceleration value of a signal in a second axis of the accelerometer. In examples, to indicate a change in performance of the radiator fan based on the peak to peak acceleration value, the controller is configured to sum the first peak to peak acceleration value and the second peak to peak acceleration value, and if the sum is greater than a threshold value, indicate the change in performance. In examples, the controller is configured to, responsive to indicating the change in performance of the radiator fan, derate engine power. In examples, the controller is configured to engage a clutch of the radiator fan to operate the radiator fan at the designated speed range, and during engine operation at engine loads above the threshold load, the controller is configured to disengage the clutch to operate the radiator fan within a second designated speed range, higher than the designated speed range. In examples, the controller is configured to determine a plurality of peak to peak acceleration values of the signal output from the accelerometer over a duration, and indicate the change in performance of the radiator fan when a rate of change of the plurality of peak to peak acceleration values over the duration is greater than a threshold rate of change.

A further embodiment of a method comprises correlating a frequency content obtained from first acceleration data to frequency content obtained from second acceleration data; and indicating a change in performance of a rotating device based on the correlation being greater than a designated value. In examples, correlating frequency content obtained from the first acceleration data to frequency content obtained from the second acceleration data comprises: weighting each respective magnitude of one or more selected frequencies of the frequency content obtained from the first acceleration data; weighting each respective magnitude of one or more selected frequencies of the frequency content obtained from the second acceleration data; and determining a mean of the weighted magnitudes obtained from the first acceleration data and the second acceleration data. In examples, indicating a change in performance of the rotating body based on the correlation comprises indicating the change in performance of the rotating body when the mean of the weighted magnitudes exceeds the designated value. In examples, the method further comprises derating engine power responsive to indicating the change in performance.

Another embodiment for a method for engine system control comprises, with at least one processor, correlating a frequency content obtained from first acceleration data received from an accelerometer to frequency content obtained from second acceleration data received from the accelerometer; with the at least one processor, indicating a change in performance of a rotating device associated with the engine system based on the correlation being greater than a designated value; and with the at least one processor, controlling the engine system based on the change in performance that is indicated. The engine system may include one or more of an engine or a device associated with the engine, including but not limited to a memory storing the first and second acceleration data, the at least processor to process the first and second acceleration data, a communication system to communicate the first and second acceleration data to a remote location, etc. In examples, correlating frequency content obtained from the first acceleration data to frequency content obtained from the second acceleration data comprises: weighting, with the at least one processor, each respective magnitude of one or more selected frequencies of the frequency content obtained from the first acceleration data; weighting, with the at least one processor, each respective magnitude of one or more selected frequencies of the frequency content obtained from the second acceleration data; and determining, with the at least one processor, a mean of the weighted magnitudes obtained from the first acceleration data and the second acceleration data. In examples, indicating a change in performance of the rotating body based on the correlation comprises indicating the change in performance of the rotating body when the mean of the weighted magnitudes exceeds the designated value. In examples, the method further comprises derating engine power responsive to indicating the change in performance.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the

What we claim is:

1. A system, comprising:
a radiator fan configured to cool cooling fluid from an engine at a radiator, the radiator fan including a clutch;
an accelerometer positioned proximate to and/or operatively coupled with a bearing of the radiator fan; and
a controller configured to:
responsive to an engine load being below a threshold load value, engage the clutch of the radiator fan to operate the radiator fan below a threshold speed, the threshold speed being a maximum rated fan speed of the radiator fan;
upon the radiator fan operating below the threshold speed, determine a peak to peak acceleration value and a kurtosis value of a signal output from the accelerometer; and
generate control signals indicative of a change in performance of the radiator fan based on the peak to peak acceleration value and the kurtosis value.

2. The system of claim 1, wherein the peak to peak acceleration value comprises a mean of a peak to peak acceleration signal extracted from the signal output from the accelerometer, a maximum value of the peak to peak acceleration signal, or a minimum value of the peak to peak acceleration signal.

3. The system of claim 2, wherein the controller is configured to extract a top envelope of the signal output from the accelerometer, extract a bottom envelope of the signal output from the accelerometer, and sum absolutes of the top envelope and the bottom envelope to extract the peak to peak acceleration signal.

4. The system of claim 1, wherein the system is mounted in a vehicle, wherein the engine has a longitudinal axis parallel to a plane of a ground on which the vehicle is configured to rest, wherein the radiator fan has a rotational axis perpendicular to the longitudinal axis of the engine, and wherein the signal output from the accelerometer measures acceleration in a first axis of the accelerometer that is perpendicular to the rotational axis of the radiator fan.

5. The system of claim 4, wherein the peak to peak acceleration value is a first peak to peak acceleration value, and wherein the controller is configured to determine a second peak to peak acceleration value of a signal in a second axis of the accelerometer.

6. The system of claim 5, wherein to determine the change in performance of the radiator fan based on the peak to peak acceleration value, the controller is configured to sum the first peak to peak acceleration value and the second peak to peak acceleration value, and if the sum is greater than a threshold value, indicate the change in performance.

7. The system of claim 1, wherein the control signals are configured to derate engine power.

8. The system of claim 1, wherein during engine operation at engine loads above the threshold load value, the controller is configured to disengage the clutch to operate the radiator fan at or above the threshold speed.

9. The system of claim 1, wherein the controller is configured to determine a plurality of peak to peak acceleration values of the signal output from the accelerometer over a duration, and generate the control signals indicative of the change in performance of the radiator fan when a rate of change of the plurality of peak to peak acceleration values over the duration is greater than a threshold rate of change.

10. A method, comprising:
with an accelerometer positioned proximate to and/or operatively coupled with a bearing of a radiator fan that is configured to cool cooling fluid from an engine at a radiator, generating a signal output;
with a controller, determining a peak to peak acceleration value and a kurtosis value of the signal output from the accelerometer, responsive to an engine load being below a threshold load value and the radiator fan operating below a threshold speed, the threshold speed being a maximum rated fan speed of the radiator fan; and
with the controller, generating control signals indicative of a change in performance of the radiator fan based on the peak to peak acceleration value and the kurtosis value.

11. The method of claim 10, wherein the peak to peak acceleration value comprises one or more of a mean of a peak to peak acceleration signal extracted from the signal output from the accelerometer or a correlation value of the peak to peak acceleration signal, and wherein the radiator fan operating below the threshold speed includes the radiator fan operating between less than the maximum rated fan speed of the radiator fan and at or above half of the maximum rated fan speed of the radiator fan.

12. The method of claim 11, further comprising, with the controller, extracting a top envelope of the signal output from the accelerometer, extracting a bottom envelope of the signal output from the accelerometer, and summing absolutes of the top envelope and the bottom envelope to extract the peak to peak acceleration signal.

13. The method of claim 10, wherein the engine, the radiator, and the radiator fan are mounted in a vehicle, wherein the engine has a longitudinal axis parallel to a plane of a ground on which the vehicle is configured to rest, and wherein the radiator fan has a rotational axis perpendicular to the longitudinal axis of the engine.

14. The method of claim 13, wherein the peak to peak acceleration value is a first peak to peak acceleration value of a signal in a first axis of the accelerometer, and further comprising, with the controller, determining a second peak to peak acceleration value of a signal in a second axis of the accelerometer.

15. The method of claim 14, wherein to determine the change in performance of the radiator fan based on the first peak to peak acceleration value, the method comprises, with the controller, summing the first peak to peak acceleration value and the second peak to peak acceleration value, and responsive to the sum being greater than a threshold value, indicating the change in performance.

16. The method of claim 10, wherein the control signals derate engine power.

17. The method of claim 10, further comprising, with the controller, engaging a clutch of the radiator fan to operate the radiator fan below the threshold speed, and with the controller and during engine operation at engine loads above the threshold load value, disengaging the clutch to operate the radiator fan at or above the threshold speed.

18. The method of claim 10, further comprising, with the controller, determining a plurality of peak to peak acceleration values of the signal output from the accelerometer over a duration, and generating the control signals indicative of the change in performance of the radiator fan responsive to when a rate of change of the plurality of peak to peak acceleration values over the duration is greater than a threshold rate of change.

19. A system, comprising:

a radiator fan configured to cool cooling fluid from an engine at a radiator;

one or more accelerometers positioned proximate to and/or operatively coupled with a bearing of the radiator fan, the one or more accelerometers configured to output sensor signals indicative of respective acceleration values of three or more different axes of the bearing or the radiator fan; and a controller configured to:

receive the sensor signals;

responsive to an engine load being below a threshold load value and the radiator fan operating within a designated speed range, determine respective peak to peak acceleration values and respective kurtosis values of the sensor signals output from the one or more accelerometers, wherein the designated speed range is between less than a maximum rated speed of the radiator fan and at or above half of the maximum rated speed of the radiator fan, where the respective peak to peak acceleration values comprise a first peak to peak acceleration value calculated from a first sensor signal output from an accelerometer in a first axis and a second peak to peak acceleration value calculated from a second sensor signal output from an accelerometer in a second axis;

weight the first peak to peak acceleration value with a higher weight and weight the second peak to peak acceleration value with a lower weight;

determine a change in performance of the radiator fan based on the kurtosis values, the first weighted peak to peak acceleration value, and the second weighted peak to peak acceleration value; and control at least one of the engine or the radiator fan based on the change in performance that is determined.

20. The system of claim 19, wherein the second axis is parallel to a rotational axis of the radiator fan and perpendicular to a longitudinal axis of the engine, and wherein the first axis is perpendicular to the second axis.

\* \* \* \* \*